(12) United States Patent
Hölterhoff et al.

(10) Patent No.: US 8,206,529 B2
(45) Date of Patent: Jun. 26, 2012

(54) METHOD AND DEVICE FOR INTERNAL REFURBISHMENT OF CORRODED HOLLOW SECTIONS

(76) Inventors: Jens Hölterhoff, Berlin (DE); Kersten Latz, Krummesse (DE)

(*) Notice: Subject to any disclaimer, the term of this patent is extended or adjusted under 35 U.S.C. 154(b) by 559 days.

(21) Appl. No.: 12/224,474

(22) PCT Filed: Feb. 27, 2007

(86) PCT No.: PCT/DE2007/000378
§ 371 (c)(1),
(2), (4) Date: Aug. 27, 2008

(87) PCT Pub. No.: WO2007/098748
PCT Pub. Date: Sep. 7, 2007

(65) Prior Publication Data
US 2009/0025856 A1 Jan. 29, 2009

(30) Foreign Application Priority Data
Mar. 3, 2006 (DE) .......................... 10 2006 010 948

(51) Int. Cl.
*E01D 22/00* (2006.01)
*B23P 6/00* (2006.01)
*B08B 9/00* (2006.01)
*B32B 37/00* (2006.01)

(52) U.S. Cl. .......... 156/94; 156/390; 29/402.01; 134/18
(58) Field of Classification Search ...................... 156/94
See application file for complete search history.

(56) References Cited

U.S. PATENT DOCUMENTS

| 5,265,648 | A  | * | 11/1993 | Lyon ............................... 138/98 |
| 6,626,195 | B1 | * | 9/2003  | Garman et al. ............. 134/104.1 |
| 2004/0020270 | A1 | * | 2/2004 | Kuikka .......................... 73/49.5 |

FOREIGN PATENT DOCUMENTS

DE 93 11 773 U1 10/1993
(Continued)

OTHER PUBLICATIONS

Wessing, W. "Relining-Verfahren mit Kunststoffrohr-Linern." 3R International, Vulkan-Verlag, Essen, DE, vol. 44, No. 11, 2005, pp. 634-641.*

(Continued)

*Primary Examiner* — Philip Tucker
*Assistant Examiner* — Vicki Wu
(74) *Attorney, Agent, or Firm* — Husch Blackwell LLP

(57) ABSTRACT

Corroded hollow sections, more preferably of orthotropic slabs, are cleaned and de-rusted on the inner surface with a rotating maximum-pressure water-jet continuously guided through the hollow section and angle-adjustable feeler-controlled corresponding to the respective interior surface region and capable of being throttled in critical regions. For the sealing of entering moisture and for corrosion protection as well as to improve the vibration behavior and the strength characteristics of the orthotropic slab, the cleaned and dried inner surface is holohedrally connected with a shapeable and stretchable fabric hose coated with a water-proof plastic in a sealing manner by means of an adhesive and using a pressure medium or a memory plastic hollow profile assuming its original shape under the effect of heat, wherein the internal pressure is maintained up to the curing of the adhesive.

10 Claims, 4 Drawing Sheets

FOREIGN PATENT DOCUMENTS

Figure 1:
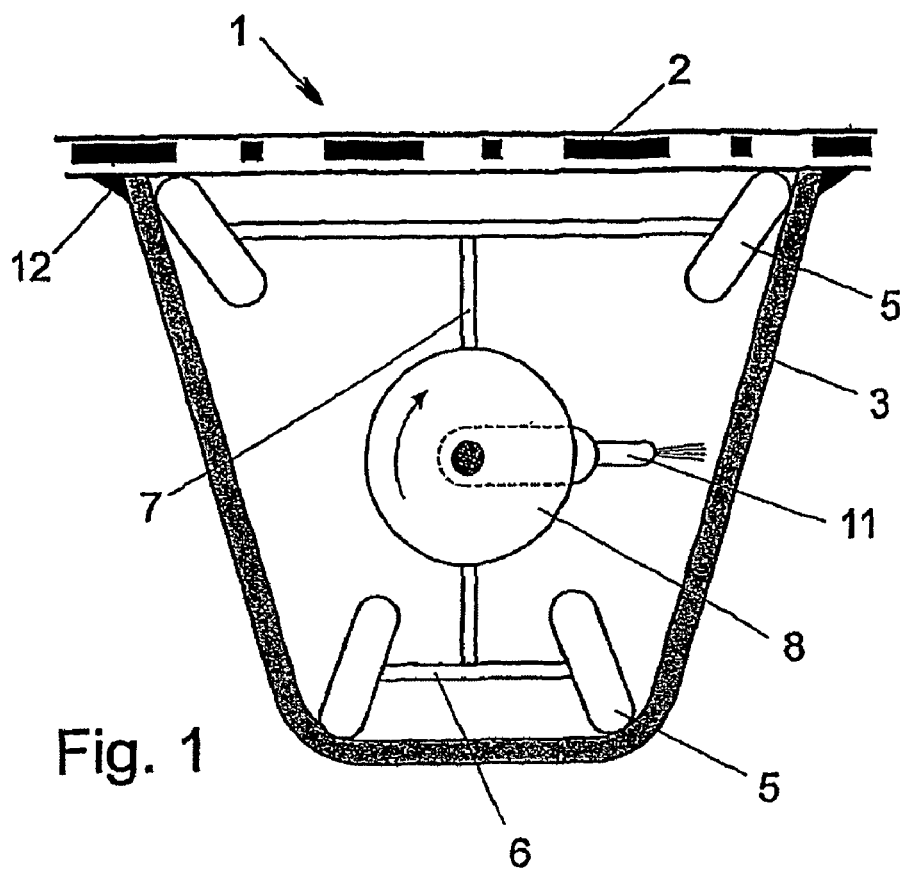

| | | |
|---|---|---|
| DE | 9311773.6 | 10/1993 |
| DE | 9311773 U1 * | 10/1993 |
| DE | 44 17 753 A1 | 11/1995 |
| DE | 4417753 | 11/1995 |
| DE | 44 24 643 A1 | 1/1996 |
| DE | 1 97 01 010 A1 | 7/1998 |
| DE | 10063234 C1 * | 7/2002 |
| EP | 0 000 576 A1 | 2/1979 |
| EP | 191411 A2 * | 8/1986 |
| EP | 1262408 A2 | 4/2002 |
| EP | 1 262 408 A | 12/2002 |
| JP | 2000197852 A * | 7/2000 |
| JP | 2003053240 A * | 2/2003 |

OTHER PUBLICATIONS

Werner, Webing. "Relining Methods Using Plastic Liners Materials, Jointing Methods, Practical Experience." 2005. 3 R International. vol. 44. pp. 634-641.*

Wessing W: "Relining-Verfahren Mit Kunststoffrohr-Linern Relining Methods Using Plastic Liners" 3R International, Vulkan-Verlag, Essen, DE, vol. 44 No. 11, 2005 pp. 634-641, XP001235602 ISSN: 0340-3386 pp. 639-640.

International Search Report related to PCT/DE2007/000378.

International Preliminary Report on related PCT/DE2007/000378.

* cited by examiner

METHOD AND DEVICE FOR INTERNAL REFURBISHMENT OF CORRODED HOLLOW SECTIONS

The invention relates to a method for the internal refurbishment of corroded hollow sections, more preferably the trapezoidal, triangular or trough hollow sections of orthotropic road slabs of steel bridges installed in bridge constructions as well as a device to carry out the method.

Orthotropic slabs are surface supporting structures which are used as ceiling and road slabs in steel construction, more preferably in bridge construction, instead of split-up support gratings, consisting of longitudinal and cross members. In orthotropic slabs, more preferably with the road slabs employed in bridge construction, corrosive manifestations can occur under certain conditions in the interior of the for example trapezoidal hollow sections welded to the bottom of the road slab because of the moisture entering via small cracks in the weld seams, so that the carrying capacity of the surface support structure is considerably impaired. In the case of bridges leading over bodies of water even a large quantity of water can accumulate in the hollow sections of the orthotropic slabs which are closed in themselves and frequently very long depending on the length of the bridge—which may contain aggressive components—, so that the slabs, apart from the corrosion of the hollow sections, are subjected to excessive load. Because of the wall thickness of the hollow sections reduced on account of the corrosion, the strength characteristics of the orthotropic slabs in addition to the traffic loads also subjected to loads through vibrations and the water absorbed from the outside, deteriorate.

Since the hollow sections of the orthotropic slabs of bridges are very long, often several hundred metres, and cannot be walked on, subsequent sealing of the hollow section against water entering from the outside and a reliable, durable and even corrosion protection with conventional coating methods or through foaming-out is not guaranteed with any safety. In addition, complete foaming-out of the hollow sections would also result in an impermissible increase of the weight and thus a reduction of the carrying capacity.

The invention is based on the object of stating a method for the internal refurbishment of the triangular, trapezoidal or trough-shaped hollow section embodiments of orthotropic slabs more preferably installed in a bridge construction, which satisfies the requirements for effective corrosion protection and the required strength characteristics and low load in all internal surface regions of the hollow section. The objective of the invention furthermore is to state a device to carry out the method.

The core of the invention consists in that the hollow sections extending in longitudinal direction over a great length, specifically of orthotropic road slabs, after the cleaning and de-rusting with a rotating maximum-pressure water jet adjustable in angle to the inner surfaces of the hollow section generated by a rotary nozzle in accordance with the arrangement to the internal surfaces of the hollow section, on the internal surface are coated with a plastic or saturated stretchable fabric hose utilising a pressure medium and are thus protected against moisture entering from the outside and against corrosion. Through the fabric hose, which assumes a close connection with the hollow section, the strength characteristics of the hollow section likewise weakened through corrosion if applicable can be improved, more preferably when in the seamlessly round-woven fabric hose preferentially of polyester yarns a greater or lesser component of metal fibres is woven into or the fabric hose is completely manufactured of metal fibres. An advantageous additional result of the fabric hose connected with the inner surface of the hollow section, particularly with road slabs severely loaded through vibrations, more preferably with a large plastic fibre component in the fabric hose, consists in a vibration-damping effect. With the proposed method for the refurbishment of hollow sections, preferentially of orthothropic slabs, not only the entry of moisture is thus prevented but building components are made available which with comparatively little expenditure are securely protected against corrosion and have improved mechanical characteristics.

Instead of the plastic-coated stretchable and shapeable fabric hose the hollow sections can also be internally lined with a memory plastic hollow profile in shape and size corresponding to the hollow section, which in a folded-in cross-sectional shape is introduced in the adhesive-coated hollow section and subjected to heating, again assumes its original shape and is pressed against the internal surfaces of the hollow section with a pressure medium.

In a further embodiment of the invention the fabric hose or the memory plastic hollow profile in addition can be mechanically pressed against the internal surfaces of the hollow section for example with a foam rubber pig in order to always bring about a close connection and thus secure sealing even in critical—for example acute-angled—corner or weld seam regions.

Alternatively to the previously mentioned mechanical pressing-on of the fabric hose or the plastic hollow profile, critical corner regions of the hollow section, more preferably acute-angled corner and weld seam regions, can be filled out with a synthetic resin before introducing the internal lining, wherein the filling forms a fillet. This guarantees additional sealing and—without the formation of a hollow space—complete contact of the internal lining in corner/weld seam regions. The embodiment of this fillet filling in corner regions is performed using a pig pulled through the hollow section and in the process continuously supplied with the synthetic resin.

The fabric hose is either pressed into the hollow section and against the internal surfaces of the latter with continuous turning inside-out by means of a pressure medium, preferentially compressed air, or the cross sectional area of the fabric hose is reduced through folding-up so that the hose under the protection of a transport sleeve can be pulled into the very long hollow section if applicable without damage and following the pulling-out of the transport sleeve, be unfolded with a pressure medium within the hollow section and pressed against and glued to its internal surfaces.

The device to carry out the method on the one hand comprises a de-rusting device consisting of a rotating nozzle that can be moved in longitudinal direction of the hollow section with a nozzle head capable of being swivelled and controlled by a scanner via a control unit. In this way it is possible to deliberately influence the impact angle of the water jet on the internal surface and also the water pressure, so that without any destructive effect—for example in critical weld seam regions—optimum de-rusting is guaranteed.

The device for the careful pulling-in of the folded fabric hose in the very long, narrow hollow section comprises a flexible transport sleeve with closing eyes attached to the free longitudinal sides of said transport sleeve and a closing cable to which the closing eyes can be attached so that the transport sleeve open in longitudinal direction can be closed around and about the folded fabric hose upon introduction of said fabric hose.

The transport sleeve can be formed of a band or of support cables attached spaced in pairs arranged in series to transport cars. The band can again be pulled out of the hollow section with a pulling cable simultaneously drawn in in the manner of a banana peel and the transport cars with the support cables can be moved out in a simple manner, specifically after the closing cable has been pulled and the folded fabric hose been released in the hollow section.

Figure 2:
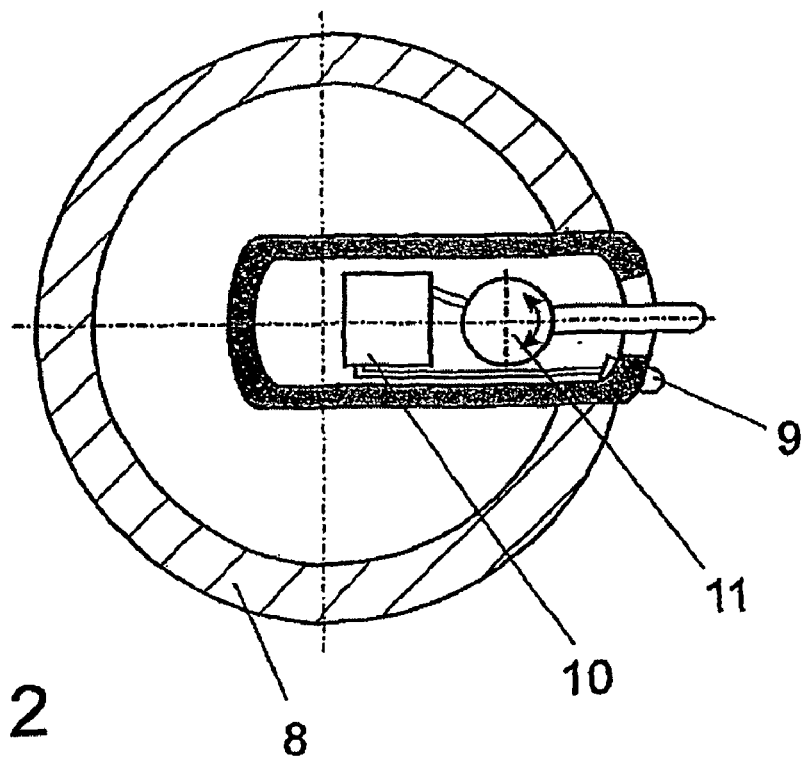
Figure 3:
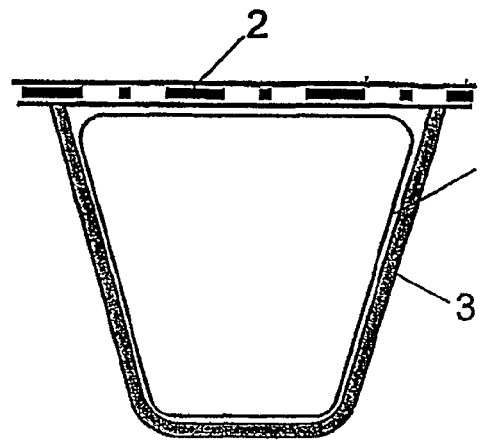
Figure 4:
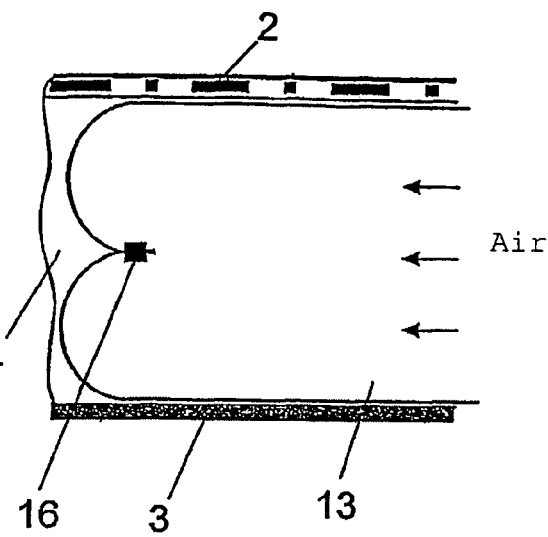
Figure 5:
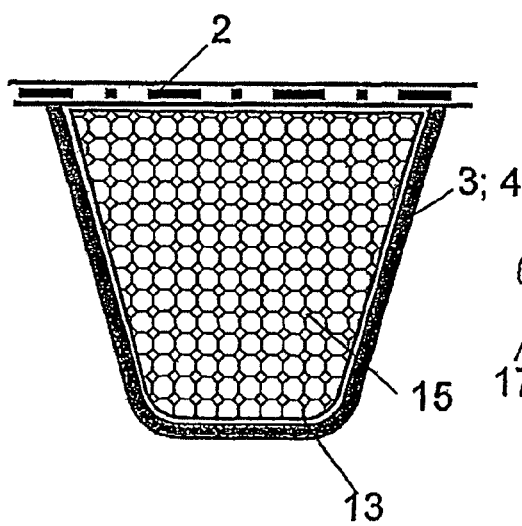
Figure 6:
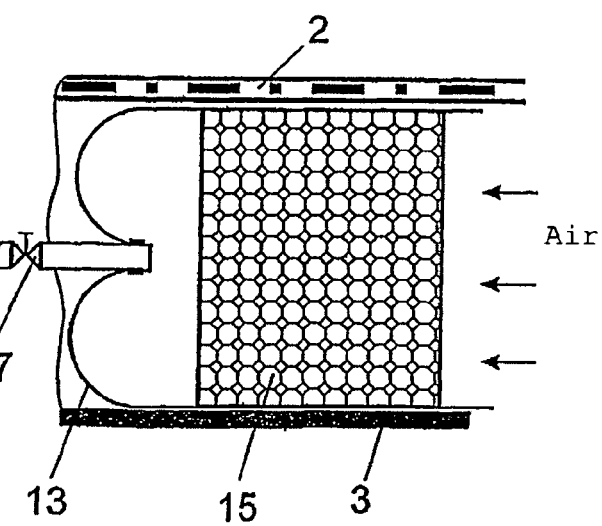
Figure 7:
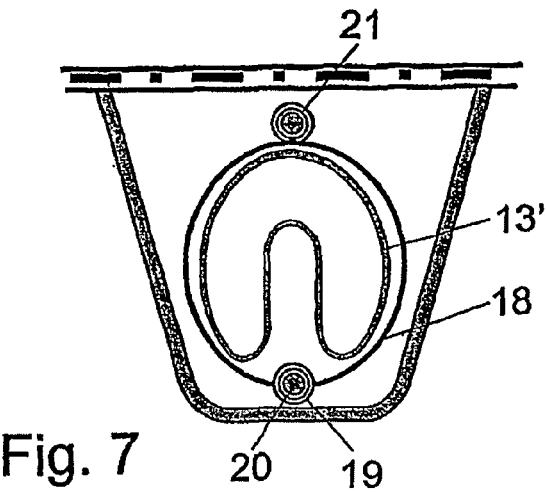
Figure 8:
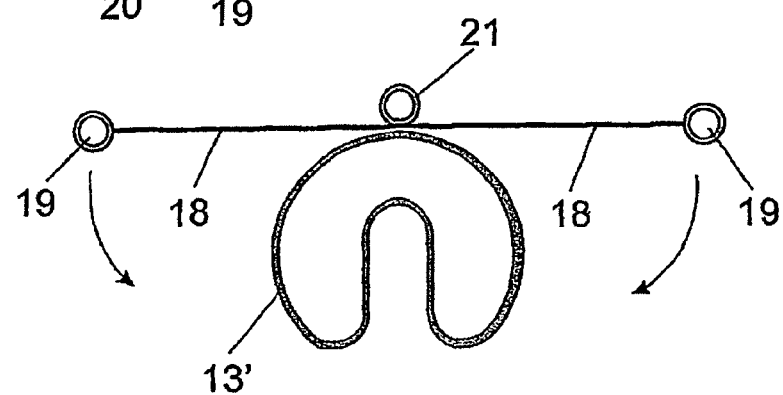
Figure 9:
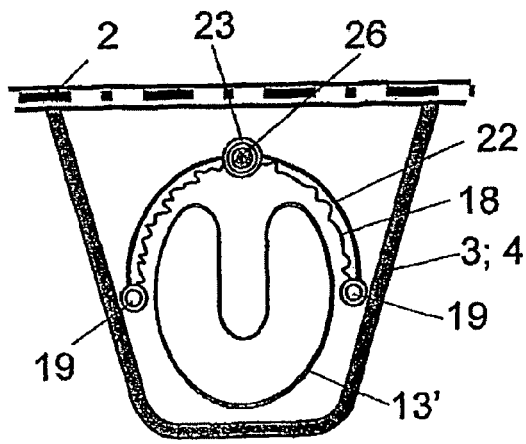
Figure 10:
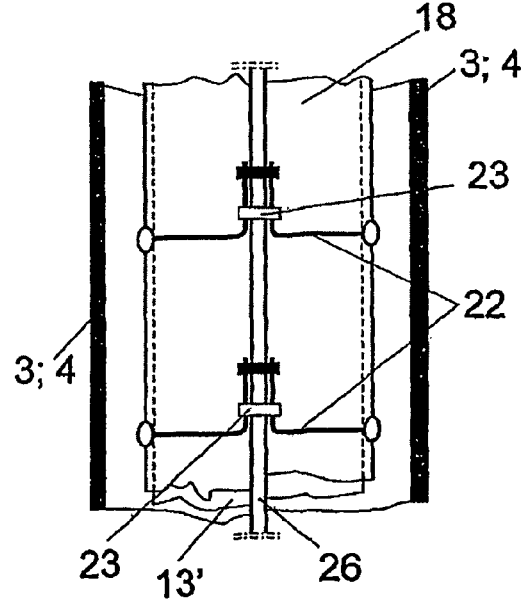
Figure 11:
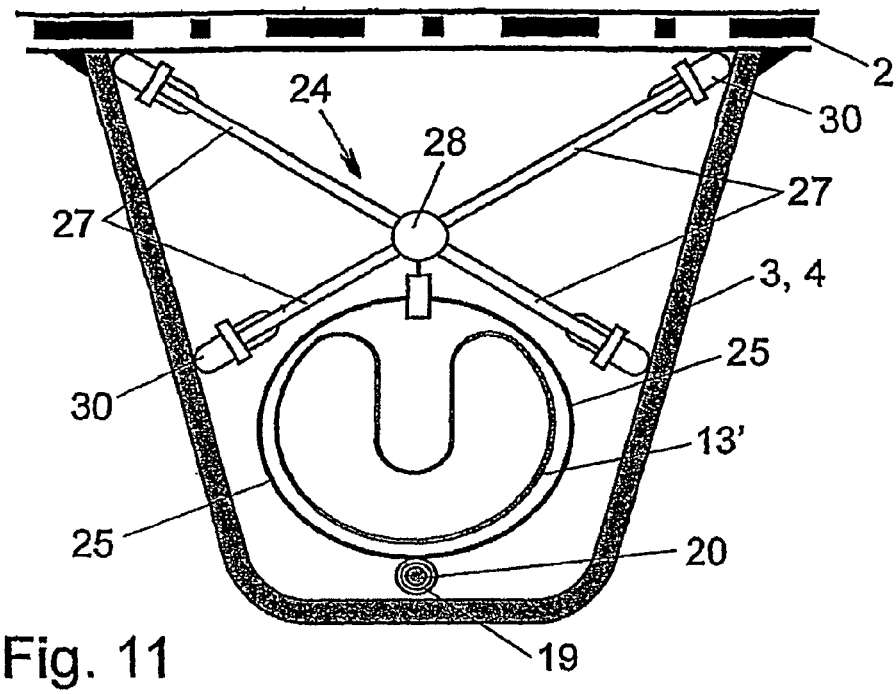
Figure 12:
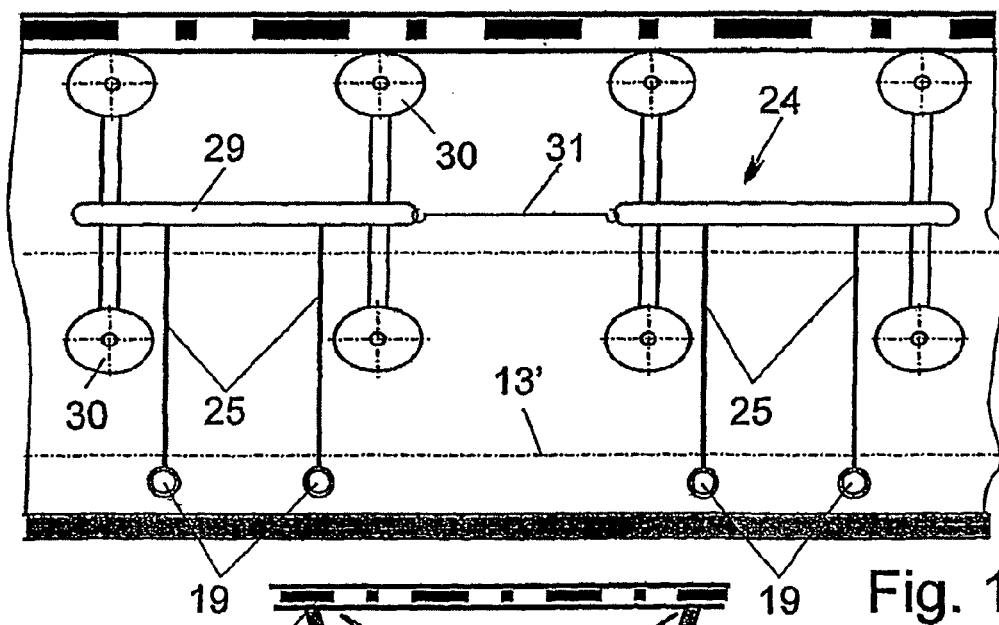

Exemplary embodiments of the invention are explained in more detail by means of the drawing. It shows:

FIG. 1 a schematic detail view of an orthotropic road slab of a bridge construction in section, with a high-pressure water-jet de-rusting device arranged in a trapezoidal hollow section;

FIG. 2 a detail view of the rotary nozzle of the high-pressure water-jet de-rusting device according to FIG. 1;

FIG. 3 a vertical section of an orthotropic road slab in the region of a hollow section, into which following the high-pressure water-jet de-rusting a water-impermeable fabric hose following inversion is introduced with the help of a pressure medium;

FIG. 4 a longitudinal section according to FIG. 3 with the fabric hose introduced in the hollow section and not yet holohedrally hugging;

FIG. 5 a vertical section in the region of the hollow section with a foam rubber pig arranged therein for the complete pressing-on of the fabric hose;

FIG. 6 a longitudinal section according to FIG. 5;

FIG. 7 a vertical section in the region of the hollow profile with a folded-up fabric hose introduced into said hollow section with the help of a transport hose;

FIG. 8 a view of the fabric hose prior to its enclosing with the transport hose;

FIG. 9 a sectional view according to FIG. 7 with yet another embodiment of the transport hose in the gathered state;

FIG. 10 a top view of the gathered transport hose according to FIG. 9;

FIG. 11 a vertical section of the hollow section with a multitude of pulling-in cars connected with one another on which the fabric hose is hooked-up during the pulling-in;

FIG. 12 a lateral sectional view according to FIG. 11; and

Figure 13:
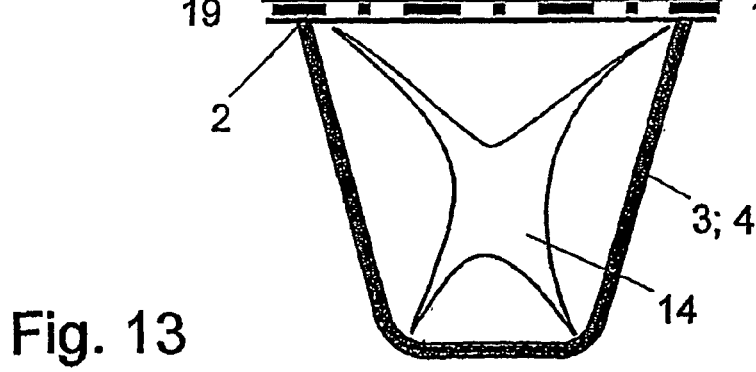

FIG. 13 a vertical section of the hollow section with a shrunk plastic profile pulled into said hollow section.

FIG. 1 shows a section of an orthotropic road slab 1, which forms a steel slab 2 and several folded steel plates 3 welded to the lower side of said steel slab running in longitudinal direction, which steel plates form a trapezoidal hollow section 4 with the steel slab 2. In the hollow section to be protected against the entry of moisture and against corrosion is located a moveable de-rusting car 6 positively guided on rollers 5 in the four corners of the hollow section 4 with a rotary nozzle 8 connected to a maximum-pressure water source (not shown) attached to the frame 7 of said de-rusting car. At the front end of the rotary nozzle 8, in which a feeler 9, which feels a control profile (not shown) associated with the rotary nozzle and identical to the hollow section 4 and a control unit 10 are integrated, are located a nozzle head 11 capable of swivelling whose swivel drive is connected to the control unit 10.

The de-rusting car 6 with its rollers 5 guided in the corners of the hollow section 4 is drawn through the hollow section 4 with a predetermined speed. The rotating water jet exiting under high pressure strikes the inner walls of the hollow section and creates a metallically bright surface. With the help of the feeler 9 and the control unit 10 the nozzle head 11 is swivelled so that the rotating water jet strikes the inner wall region of the hollow section 4 concerned at a predetermined angle and can create a metallically bright surface. With the help of the feeler 9 and the control unit 10 the water jet in the region of the connecting points 12 of the folded steel plate 3 with the steel slab 2 can be throttled in order not to damage the weld seams located there. The corroded material detached from the inner walls is flushed away with the water jet.

Once the inner surfaces of the hollow section 4 have dried, a water-impermeable inner lining is introduced in said hollow section which consists of a fabric hose 13 saturated or coated with a water-proof plastic or a plastic profile 14 (FIG. 13) and whose development corresponds to the inner dimension of the hollow section 4 to be refurbished and under pressure—and exposure to heat with an "extruded" plastic profile—holohedrally glued to the inner walls of the hollow section 4 by means of a solvent-free two-component adhesive. Curing of the adhesive can take place at normal temperature or with the supply of heat with UV-light or internal pressure.

The seamlessly round-woven fabric hose 13 consists of polyester yarns or of polyester fibres and metal fibres or of metal fibres only in order to appropriately influence the strength characteristics and/or the vibration behaviour of the hollow sections based on the material selection and combination. A reduction of the strength of the hollow sections due to corrosion can be counteracted through the metal fibres or a metal fibre component, while the plastic fabric contributes considerably to the vibration damping. A substantial effect of the fabric hose 13 holohedrally glued to the internal surfaces of the hollow section 4 consists in the sealing of the hollow section against water entering from the outside and the corrosion protection.

Introducing the water-impermeable inner lining body, i.e. of the fabric hose 13 or the plastic profile 14 can be performed in various manners.

According to a first embodiment version shown according to one of the FIGS. 3 to 6 a fabric hose 13 saturated with water-impermeable plastic and on the inner surface coated with adhesive is attached to one side of the hollow section 4 with one end, the inner surface turned inside out and with the help of a pressure medium ever further pushed into the hollow profile 4 wherein under the effect of the gaseous or liquid pressure medium the inner surface of the fabric hose 13 turned inside out and coated with adhesive is pressed against the inner surface of the hollow section 4.

As is shown in FIG. 3 the acute-angled corner regions of the hollow section 4 after the preceding inversion method are possibly not completely covered with the fabric material. In order to guarantee the holohedral coverage of the inner surface and thus the sealing of the hollow body relative to the surroundings as well as secure corrosion protection, a foam rubber pig 15 is subsequently pushed through the fabric hose 13 located in the hollow section 4 with a pressure medium in a second method step. Before the introduction of the foam rubber pig 15 a valve 17 is inserted in the closed end 16 of the fabric hose 14 in order to expand the pressure medium which compresses during the advancing of the foam rubber pig 15. The profile of the foam rubber pig 15 corresponds to that of the hollow section 4 so that the fabric hose 13 contacts the hollow section 4 free of folds and holohedrally, specifically also in acute-angled corners.

The method described above is repeated on all hollow sections 4 running in longitudinal direction of the orthotropic road slab 1. After the curing of the adhesive the hollow sections are sealed against the entry of moisture from the outside and against further corrosion and their vibration damping characteristics as well as the strength characteristics if applicable are improved.

According to yet another method version described in the FIGS. 7 to 12 a folded-up fabric hose 13' coated on the outer surface with adhesive is pulled into the hollow section 4 using an auxiliary device with the help of a pulling device. After the removal of the auxiliary device the fabric hose 13' closed on one end is supplied with a pressure medium on the opposite end in order to unfold the fabric hose 13' and to apply said fabric hose with its outer surface provided with adhesive to the inner surface of the hollow body 4. In a subsequent method step the fabric hose 13', if required, can be additionally pressed against the inner surface of the hollow section 4 and simultaneously smoothed with the foam rubber pig 15 described above so that after the subsequent curing step secure sealing against the entry of moisture as well as improved material characteristics of the hollow section 4 are guaranteed.

The first embodiment of a transport device for the pulling-in of the folded fabric hose 13' in the hollow section 4 described in the FIGS. 7 to 10 comprises a flexible transport sleeve 18 capable of being closed in longitudinal direction, consisting of a cloth with closing eyes 19 attached spaced to both its longitudinal edges, in the present exemplary embodiment in form of snap hooks. The transport device further comprises a closing cable 20 and a pulling cable 21. The folded fabric hose 13' together with the transport sleeve 18, the pulling cable 21 and the closing cable 20 is pulled into the hollow section 4 wherein the transport sleeve 18 on the entry side of the hollow section 4 is placed about the fabric hose 13' and the closing eyes 19 are connected with the closing cable 20. The fabric hose 13' is thus pulled into the hollow section 4 under the protection of the transport sleeve 18 enveloping said fabric hose so that the fabric hose 13' and its coating/adhesive layer are not damaged during the pulling-in. After the pulling-in process the closing cable 20 is first pulled out of the closing eyes 19 and after this the transport sleeve 18 which is now again open in longitudinal direction is pulled out of the hollow section 4 with the pulling cable 21 attached to the transport sleeve at its rear end comparable with the peeling of a banana peel. After this, the fabric hose 13' is connected with the inner surface of the hollow section 4 as described above.

In order to facilitate the previously described pulling-out of the transport sleeve 18 if applicable, guiding eyes 23 are attached to the transport sleeve 18 at regular spacing in an expanded embodiment version as is shown by the FIGS. 9 and 10, in which a gathering cable 26 is guided on which spaced—each time in pairs—radial cables 22 are attached and guided through the respective guiding eye. At their other—free—ends the radial cables 22 are each connected with one of the closing eyes 19 attached to the longitudinal end of the transport sleeve 18. Once the closing cable 20 has been pulled as described above the transport sleeve 18—upon a pulling effect on the gathering cable 26 and thus on the longitudinal edges of the transport sleeve 18 via the radial cables 22—is initially gathered and can subsequently be more easily pulled out of the hollow section 4 with a pulling cable 21 in the manner described above.

According to yet another embodiment shown in the FIGS. 11 and 12 the transport sleeve 18' consists of support cables 25 attached spaced in pairs to transport cars 24 which are connected with one another, at the free ends of which support cables, closing eyes 19 are attached. The transport cars 24 consist of two frame parts 27 crossing each other in a joint 28 which are securely connected with each other through a longitudinal bar 29. At the end of the frame parts, angle-adjustable running rollers 30 are attached. Through the provision of various long, preferentially telescopic frame parts 27 and the adjustable running rollers 30 the transport cars 24 can be thus adapted to variously shaped and dimensioned hollow sections 4. When drawing in the fabric hose 13' by means of a winch acting on the first transport car 24 the support cables 25 are placed about the fabric hose 13'. The ends of the support cables 25 are connected with the closing cable 20 by means of the closing eyes 19 and in the suspended position so created the fabric hose 13' is carefully pulled into the hollow section 4. Transport cars 25 following one another are connected with one another by means of a drawbar 31. After the pulling of the closing cable 20 the folded fabric hose 13' freely lies in the hollow section 4 and the transport cars 24 with the support cables 25 can be comfortably run out of the hollow section 4. Connecting the fabric hose 13' with the inner surfaces of the hollow section 4 again takes place in the manner described above.

As is shown in FIG. 13, the hollow section 4 can also be lined and glued to a plastic profile 14 dimensioned in accordance with the hollow section—in this case trapezoidal. After the extrusion this plastic profile 14 in the still warm state is folded up—in the present case for example X-shaped—so far that it can subsequently be comfortably introduced into the hollow section 4 coated on the inner surfaces with adhesive. The drawn-in—"extruded" X-shaped—plastic profile is heated with steam and because of the memory effect now re-assumes its original shape. Under the effect of compressed air during the subsequent cooling-down process the plastic profile 14 is pressed against the inner surfaces of the hollow section and glued to these, so that the hollow section is sealed in a water-proof manner and no moisture from the outside is able to reach the interior of the hollow body.

LIST OF REFERENCE NUMBERS

1 Orthotropic road slab
2 Steel slab
3 Steel plate
4 Hollow section
5 Rollers
6 De-rusting car
7 Frame
8 Rotary nozzle
9 Scanner
10 Control unit
11 Nozzle head capable of being swivelled
12 Connecting point (weld seam between ⅔)
13 Fabric hose
13' Folded fabric hose
14 Plastic profile
15 Foam rubber pig
16 Closed end of 13
17 Valve
18 Transport sleeve
19 Closable eye/snap hook
20 Closing cable
21 Pulling cable
22 Radial cable
23 Guiding eye
24 Transport car
25 Support cable
26 Gathering cable
27 Frame parts
28 Joint
29 Longitudinal bar
30 Running rollers
31 Drawbar

The invention claimed is:

1. A method for the internal refurbishment of corroded hollow sections of orthotropic road slabs of steel bridges, characterized in that the inner surface of the hollow sections is cleaned and de-rusted with a rotating maximum-pressure water-jet continuously guided in a forward direction through the hollow section and angle-adjustable corresponding to the respective profile controlled by a surface feeler in rotation about the hollow section inner surface and capable of being throttled in critical hollow-section regions; and the cleaned and dried inner surface of the hollow section is holohedrally connected to a surface of a fabric hose in a sealing manner to the inner surface of the hollow section by means of a previously applied adhesive and under the effect of a pressure medium said fabric hose being saturated with a water-proof plastic under the effect of a pressure medium or a memory plastic hollow profile assuming its original shape under the effect of heat; and the adhesive is subsequently cured while the internal pressure is maintained.

2. The method according to claim 1, characterized in that the fabric hose is a seamless round-woven stretchable fabric of plastic fibres and/or metal fibres.

3. The method according to claim 1, characterized in that the of the fabric hose has a plastic coating that consists of polyurethane or polyethylene and that a solvent-free two-component adhesive is employed as adhesive.

4. The method according to claim 1, characterized in that the fabric hose on in the interior is subjected to compressed-air pressure.

5. The method according to claim 4, characterized in that the holohedral pressing-on and smoothing of the fabric hose is additionally performed mechanically with a foam rubber pig pushed through the fabric hose by means of compressed air the profile of which pig corresponds to that of the hollow section.

6. The method according to claim 1, characterized in that the fabric hose for introduction in the hollow section is turned inside out at the one open end and pushed into the hollow profile by means of compressed air and in the process the fabric hose connected to the other end with the inner surface turned inside out is gradually pressed into the hollow section.

7. The method according to claim 6, characterized in that during the subsequent pushing-through of a foam rubber pig at the rear sealed end of the fabric hose controlled air discharge takes place controlled by means of a valve.

8. The method according to claim 1, characterized in that the fabric hose is folded to a reduced cross section and within a sleeving is pulled into the hollow section by means of a pulling device, wherein the interior of the fabric hose following the removal of the sleeving is subjected to compressed-air pressure and in the process unfolded and pressed against the inner surface of the hollow section and glued to the latter in a sealing manner.

9. The method according to claim 1, characterized in that the adhesive while maintaining the internal pressure acting on the fabric hose or on the memory plastic hollow profile is cured at room temperature or with elevated temperature or by means of UV-light.

10. The method according to claim 1, characterized in that in a corner and weld-seam regions of the hollow section before the introduction of the fabric hose or the memory plastic hollow profile a sealing and filling material is formed in using a coating pig pulled through the hollow section, wherein the filling comprises a filleting facing the interior of the hollow body.

\* \* \* \* \*